United States Patent
Otsuka

(10) Patent No.: US 10,994,624 B2
(45) Date of Patent: May 4, 2021

(54) POWER CONVERSION SYSTEM AND CABLE RELAY

(71) Applicant: Mitsubishi Electric Corporation, Tokyo (JP)

(72) Inventor: Hiroshi Otsuka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/610,801

(22) PCT Filed: Jan. 25, 2019

(86) PCT No.: PCT/JP2019/002487
§ 371 (c)(1),
(2) Date: Nov. 4, 2019

(87) PCT Pub. No.: WO2020/152850
PCT Pub. Date: Jul. 30, 2020

(65) Prior Publication Data
US 2020/0384871 A1 Dec. 10, 2020

(51) Int. Cl.
| | |
|---|---|
| B60L 53/18 | (2019.01) |
| B60L 53/16 | (2019.01) |
| H01M 10/44 | (2006.01) |
| H01R 13/639 | (2006.01) |
| H02G 15/08 | (2006.01) |
| H02J 7/00 | (2006.01) |

(52) U.S. Cl.
CPC ............... B60L 53/18 (2019.02); B60L 53/16 (2019.02); H01M 10/44 (2013.01); H01R 13/639 (2013.01); H02G 15/08 (2013.01); H02J 7/007 (2013.01); H02J 7/0031 (2013.01)

(58) Field of Classification Search
CPC . B60L 53/16; B60L 53/18; H02J 7/007; H02J 7/0031; H01M 10/44
USPC ......................................... 320/104
See application file for complete search history.

(56) References Cited

U.S. PATENT DOCUMENTS

| | | | |
|---|---|---|---|
| 2012/0262115 A1 | 10/2012 | Ichikawa et al. | |
| 2013/0190968 A1* | 7/2013 | Nitzberg | G07C 3/00 701/31.6 |
| 2015/0288201 A1* | 10/2015 | Hatakeyama | B60L 3/04 320/107 |
| 2017/0063146 A1* | 3/2017 | Ceravalo | B60R 16/03 |
| 2018/0236888 A1 | 8/2018 | Yabuuchi et al. | |
| 2019/0217728 A1* | 7/2019 | Reber | B60L 53/11 |

(Continued)

FOREIGN PATENT DOCUMENTS

| | | |
|---|---|---|
| JP | 11-220813 A | 8/1999 |
| JP | 2013-236466 A | 11/2013 |
| JP | 2014-204494 A | 10/2014 |

(Continued)

*Primary Examiner* — Nathaniel R Pelton
(74) *Attorney, Agent, or Firm* — Birch, Stewart, Kolasch & Birch, LLP

(57) ABSTRACT

A power conversion system includes a power conversion device that controls charging or discharging of an electric-powered vehicle including a storage battery, and a cable relay connected to the power conversion device via a first cable, and connected to a connector connectable to the electric-powered vehicle, via a second cable; and the cable relay includes a power supply that provides a drive voltage to a solenoid included in the connector.

10 Claims, 4 Drawing Sheets

(56) References Cited

U.S. PATENT DOCUMENTS

2019/0237977 A1\* 8/2019 Bober .................. H02J 7/0021
2019/0280498 A1 9/2019 Suzuki

FOREIGN PATENT DOCUMENTS

| JP | 2015-89285 A | 5/2015 |
| JP | 2015-119518 A | 6/2015 |
| WO | WO 2011/080811 A1 | 7/2011 |
| WO | WO 2014/097697 A1 | 6/2014 |
| WO | WO 2017/022606 A1 | 2/2017 |
| WO | WO 2018/096673 A1 | 5/2018 |

\* cited by examiner

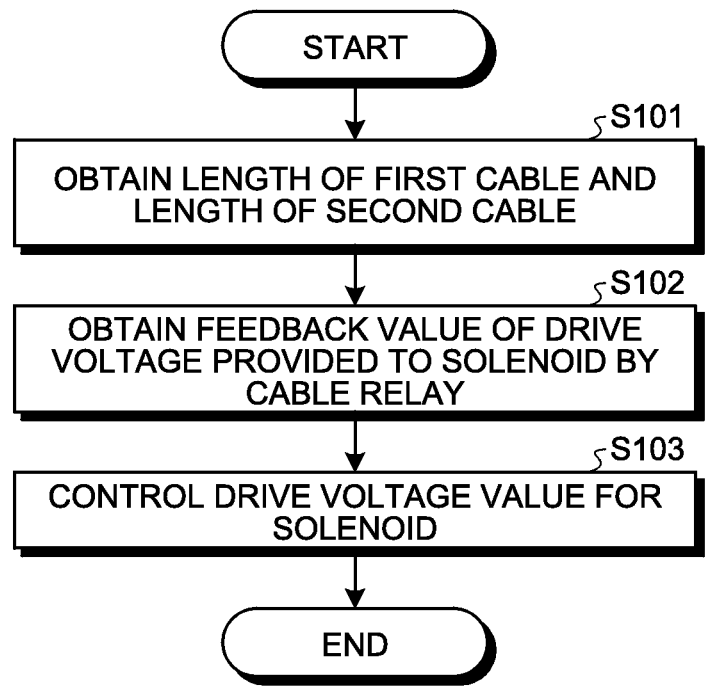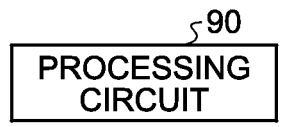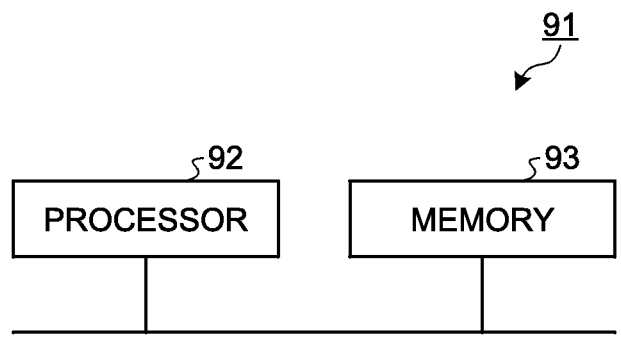

POWER CONVERSION SYSTEM AND CABLE RELAY

FIELD

The present invention relates to a power conversion system and to a cable relay that each control charging or discharging of an electric-powered vehicle.

BACKGROUND

In recent years, electric-powered vehicles are becoming popular that use electricity as the energy source, such as an electric vehicle (EV) and a plug-in hybrid electric vehicle (PHEV). In addition, a power conversion system is also becoming popular that allows a residential load to use electricity stored in a storage battery installed in these types of electric-powered vehicles.

For example, Patent Literature 1 discloses a charging system including a main box that provides control of charging of an electric automobile, and a cable relay smaller than the main box, and installable at a location apart from the main box. This charging system uses separate cables for connection between the main box and the cable relay, and for connection between the cable relay and a charge connector. Thus, providing the cable relay near the place where an electric automobile is parked can reduce the length of the cable from the cable relay to the charge connector, used by the user upon plugging the charge connector into the electric automobile. This reduces the weight of the cable used by the user, thereby providing an advantage in facilitating handling of the cable by the user.

CITATION LIST

Patent Literature

Patent Literature 1: Japanese Patent Application Laid-open No. 2013-236466

SUMMARY

Technical Problem

However, when a solenoid is used to secure the charge connector to prevent the charge connector from dropping out of the vehicle, the technology disclosed in Patent Literature 1 causes the drive voltage provided to the solenoid to decrease by an amount corresponding to the length of the cable from the main box to the connector. In this case, providing a drive voltage increased by the amount to compensate for the deficiency from the required voltage enables the required voltage to be provided to the solenoid. But, this presents a problem of necessity of maintaining the cable connecting between the main box and the cable relay at a constant length, which then presents a problem in limitation of the installation location of the cable relay.

The present invention has been made in view of the foregoing, and it is an object of the present invention to provide a power conversion system capable of increasing the flexibility of the installation location of a cable relay.

Solution to Problem

To solve the problem and achieve the object described above, a power conversion system according to the present invention includes: a power conversion device to control charging or discharging of an electric-powered vehicle including a storage battery; and a cable relay connected to the power conversion device via a first cable, and connected to a connector connectable to the electric-powered vehicle, via a second cable. The cable relay includes a power supply to provide a drive voltage to a solenoid included in the connector.

Advantageous Effects of Invention

A power conversion system according to the present invention provides an advantage in being capable of increasing the flexibility of the installation location of a cable relay.

BRIEF DESCRIPTION OF DRAWINGS

FIG. 5 is a flowchart illustrating an operation of the solenoid voltage control circuit illustrated in FIG. 2.

FIG. 6 is a diagram illustrating a dedicated hardware element for implementing the functionality of the power conversion system according to the first embodiment of the present invention.

FIG. 7 is a diagram illustrating a configuration of a control circuit for implementing the functionality of the power conversion system according to the first embodiment of the present invention.

DESCRIPTION OF EMBODIMENT

A power conversion system and a cable relay according to an embodiment of the present invention will be described in detail below with reference to the drawings. Note that this embodiment is not intended to limit the scope of this invention.

First Embodiment

Figure 1:
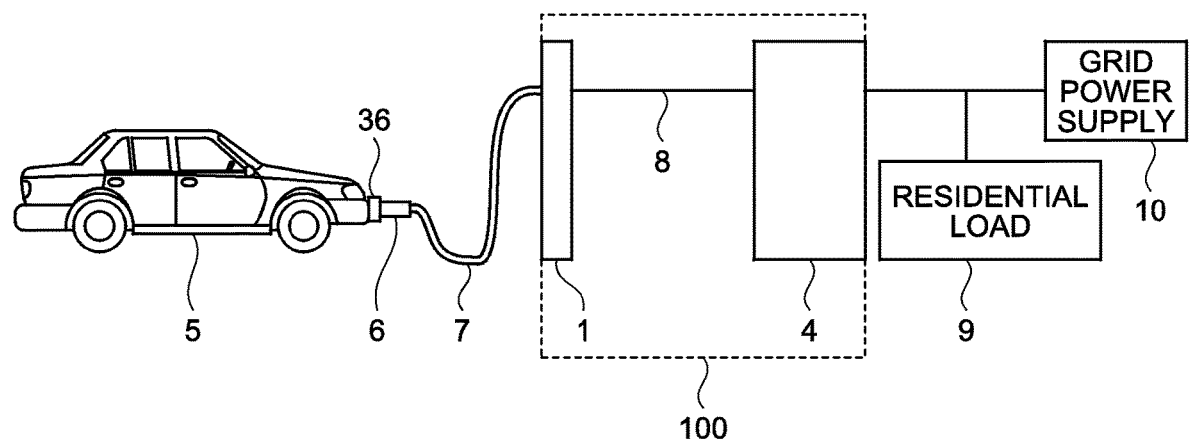
FIG. 1 is a diagram illustrating a situation in which a power conversion system according to a first embodiment of the present invention is connected to an electric-powered vehicle.

FIG. 1 is a diagram illustrating a situation in which a power conversion system 100 according to a first embodiment of the present invention is connected to an electric-powered vehicle 5. The power conversion system 100 includes a cable relay 1, a charge-discharge system 4, and a first cable 8. The charge-discharge system 4 is connected to a grid power supply 10 and to a residential load 9. The cable relay 1 can be disposed apart from the charge-discharge system 4. The cable relay 1 has a capability of relaying cables for electrically connecting the charge-discharge system 4 and the electric-powered vehicle 5. The cable relay 1 is connected to the charge-discharge system 4 through the first cable 8, and to the electric-powered vehicle 5 through a second cable 7 having a connector 6 at one end thereof.

The cable relay 1 is disposed, for example, near the parking lot where the electric-powered vehicle 5 is parked. The cable relay 1 has connection ports (not illustrated) for connecting with each of the first cable 8 and the second cable 7, and at least one of the first cable 8 and the second cable 7 is replaceable. For example, in a case in which the first cable 8 is replaceable, the length of the first cable 8 is determined based on the distance between the installation place of the cable relay 1 and the installation place of the charge-discharge system 4. In addition, in a case in which the second cable 7 is replaceable, the length of the second cable 7 is determined based on the distance between the installation place of the cable relay 1 and the parking place of the electric-powered vehicle 5.

The electric-powered vehicle 5 is a vehicle that uses electrical energy, such as an EV or a PHEV. The electric-powered vehicle 5 has a receptacle 36, to which the connector 6 of the second cable 7 can be connected.

The charge-discharge system 4 is capable of converting alternating current power supplied from the grid power supply 10 into direct current power, and of supplying the DC power to the electric-powered vehicle 5 via the first cable 8, the cable relay 1, the second cable 7, and the connector 6. When the electric-powered vehicle 5 is used as a power supply, the charge-discharge system 4 is also capable of receiving DC power stored in the electric-powered vehicle 5 via the connector 6, the second cable 7, the cable relay 1, and the first cable 8, of converting the DC power into AC power, and of supplying the AC power to the residential load 9.

Figure 2:
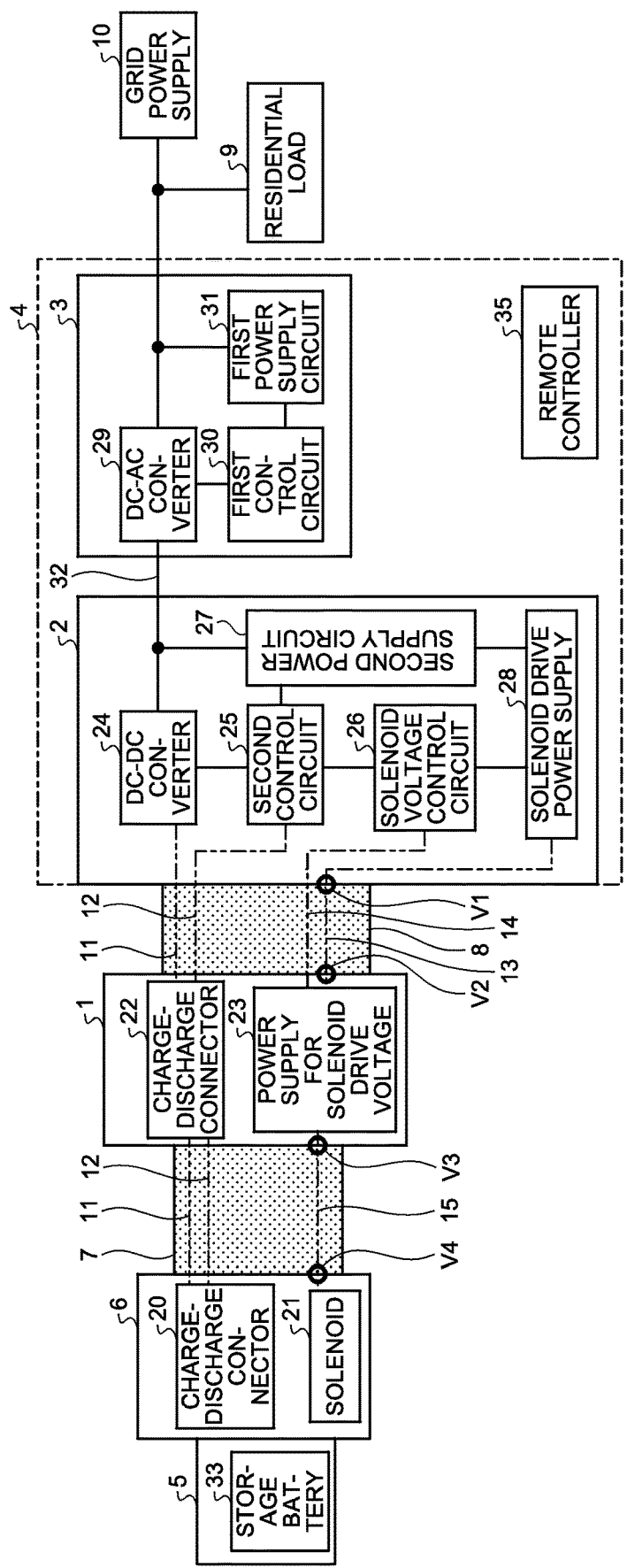
FIG. 2 is a diagram for describing a detailed configuration of the power conversion system illustrated in FIG. 1.

FIG. 2 is a diagram for describing a detailed configuration of the power conversion system 100 illustrated in FIG. 1. The cable relay 1 includes a charge-discharge connector 22 and a power supply for solenoid drive voltage 23. The charge-discharge connector 22 is a connector for relaying the DC power line 11 and the vehicle communication line 12 between the first cable 8 and the second cable 7. The power supply for solenoid drive voltage 23 is a power supply for supplying electrical power for driving a solenoid 21 included in the connector 6. The power supply for solenoid drive voltage 23 regulates the value of the drive voltage provided from the charge-discharge system 4, and provides the voltage having the regulated value to the solenoid 21.

The electric-powered vehicle 5 includes a storage battery 33, and is thus capable of operating as a DC power supply. The storage battery 33 is a power supply for driving the electric-powered vehicle 5. The storage battery 33 is a secondary battery that can charge and discharge electrical power. The storage battery 33 is, for example, a lithium ion battery, which provides a high output and a high energy density with low degradation under repeated charging and discharging operations.

The charge-discharge system 4 includes a first power conversion device 3, a second power conversion device 2, and a remote controller 35. The first power conversion device 3 has functionality of conversion between AC power and DC power. The second power conversion device 2 has functionality of converting the voltage level of DC power, and functionality of controlling of charging and discharging of the electric-powered vehicle 5. When the storage battery 33 included in the electric-powered vehicle 5 is to be charged, the first power conversion device 3 converts the AC power supplied from the grid power supply 10 into DC power, and the second power conversion device 2 converts a DC bus voltage 32, which is the DC voltage generated from the conversion by the first power conversion device 3, into a DC voltage having a voltage value suitable for charging the storage battery 33 included in the electric-powered vehicle 5. Alternatively, when the storage battery 33 of the electric-powered vehicle 5 is used as a DC power supply, the second power conversion device 2 is capable of converting the voltage level of the DC power from the storage battery 33 into the voltage level of the DC bus voltage 32, and the first power conversion device 3 is capable of converting the DC power into AC power to supply the AC power to the residential load 9.

The first power conversion device 3 includes a direct current (DC) alternating current (AC) converter 29 for converting the AC voltage applied by the grid power supply 10 into the DC bus voltage 32, a first control circuit 30 for controlling the DC-AC converter 29, and a first power supply circuit 31 that supplies electrical power to the first control circuit 30. The first power supply circuit 31 converts the power supply provided from the grid power supply 10 into a DC voltage for driving the first control circuit 30 to provide a power supply to the first control circuit 30, which controls the DC-AC converter 29. The first control circuit 30 operates under the DC power supplied from the first power supply circuit 31 to control the DC-AC converter 29. The DC-AC converter 29 is a DC-AC converter that can provide bidirectional charging and discharging.

The second power conversion device 2 includes a DC-DC converter 24. The DC-DC converter 24 is a voltage converter that converts the DC bus voltage 32, which is the DC voltage generated from the conversion by the first power conversion device 3, into a DC voltage having a value suitable for charging the storage battery 33 included in the electric-powered vehicle 5. The second power conversion device 2 further includes a second control circuit 25, a solenoid voltage control circuit 26, a second power supply circuit 27, and a solenoid drive power supply 28. The second power supply circuit 27 converts the voltage of the DC bus voltage 32 into a DC voltage at a value required by the second control circuit 25 and by the solenoid drive power supply 28, and provides the converted DC voltage to the second control circuit 25 and to the solenoid drive power supply 28. The second control circuit 25 is driven by the DC power supplied from the second power supply circuit 27 to control the DC-DC converter 24 and the solenoid voltage control circuit 26, and thus controls charging and discharging of the storage battery 33 of the electric-powered vehicle 5. The solenoid voltage control circuit 26 controls the drive voltage provided to the solenoid 21. Specifically, the solenoid voltage control circuit 26 controls the value of the drive voltage output by the solenoid drive power supply 28 and the value of the drive voltage output by the power supply for solenoid drive voltage 23 included in the cable relay 1. This enables the value of the drive voltage provided to the solenoid 21 to be controlled.

The charge-discharge system 4 is controlled by the remote controller 35. The remote controller 35 includes a display, which can display a configuration screen for entering the length of at least one the first cable 8 and the second cable 7. A user can use the remote controller 35 to configure various installation settings and the operation mode for charging or discharging of the charge-discharge system 4. The remote controller 35 may be a controller dedicated to the charge-discharge system 4, part of a home energy management system (HEMS), a smartphone, or a tablet. The remote controller 35 is wirelessly connectable to the first power conversion device 3 and to the second power conversion device 2. Use of wireless communication removes the constraint of the place of operating the charge-discharge system 4, thereby improving the configuration operations during installation, and user friendliness.

The second power conversion device 2 is connected to the cable relay 1 using the first cable 8. The first cable 8 includes, bundling in the single cable, a DC power line 11, which receives DC power generated by the second power conversion device 2, or DC power output by the cable relay 1; a vehicle communication line 12 for enabling communication between electric-powered vehicle 5 and the charge-discharge system 4; a power line 13 connected to the solenoid drive power supply 28; and a control line 14 connected to the solenoid voltage control circuit 26. Such bundling of multiple lines in one cable improves installation workability.

The output of the DC-DC converter 24 of the second power conversion device 2 is connected to the charge-discharge connector 22 in the cable relay 1. The control line 14 for the power supply for solenoid drive voltage 23 output from the solenoid voltage control circuit 26 is connected to the power supply for solenoid drive voltage 23. The output of the solenoid drive power supply 28 is connected to the power supply for solenoid drive voltage 23.

The power supply for solenoid drive voltage 23 is a power supply for providing a drive voltage to the solenoid 21 included in the connector 6. The power supply for solenoid drive voltage 23 regulates the voltage value of the output of the solenoid drive power supply 28, and outputs the voltage having the regulated value to the solenoid 21. The output of the power supply for solenoid drive voltage 23 is connected to the solenoid 21 via a control signal line 15. The charge-discharge connector 22 relays the DC power line 11 and the vehicle communication line 12.

The connector 6 is connected to the second cable 7. The second cable 7 includes the DC power line 11, the vehicle communication line 12, and the control signal line 15. The DC power line 11 and the vehicle communication line 12 in the second cable 7 are connected to the charge-discharge connector 20 of the connector 6. The connector 6 can be plugged into the electric-powered vehicle 5, and is mechanically secured to the electric-powered vehicle 5 to prevent the connector 6 from dropping out of the electric-powered vehicle 5 during charging and discharging. The solenoid 21 forms a locking mechanism to secure the connector 6 to the electric-powered vehicle 5.

Figure 3:
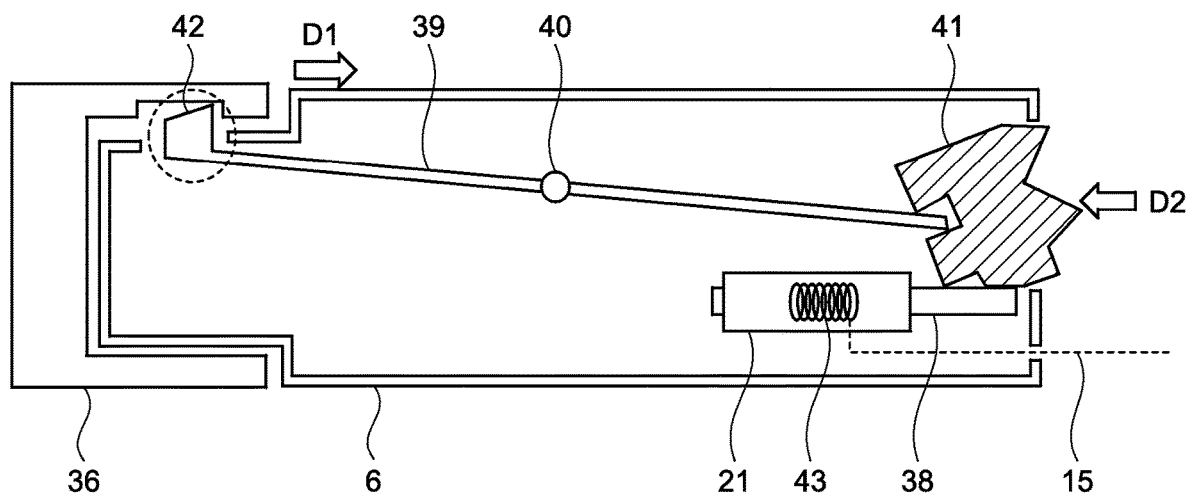
FIG. 3 is a diagram illustrating a locking mechanism for a connector and a receptacle illustrated in FIG. 1 in a first state.

FIG. 3 is a diagram illustrating the locking mechanism for the connector 6 and the receptacle 36 illustrated in FIG. 1 in a first state. In the first state, the connector 6 is secured in the receptacle 36. The connector 6 includes therein a lock shaft 39. The lock shaft 39 has a lock shaft latch 42 at one end, and engages with an operation switch 41 at another end. The lock shaft 39 rotates about a pivot point 40 depending on the state of the operation switch 41. In the first state, one end of the lock shaft 39 fits into the recessed portion of the receptacle 36 by means of the lock shaft latch 42, and another end of the lock shaft 39 fits into the recessed portion of the operation switch 41. Due to the restriction of movement of the operation switch 41 by the solenoid 21 in this state, an attempt to pull out the connector 6 in a direction D1 will fail.

The movement of the solenoid 21 is controlled by the drive voltage input through the control signal line 15. The drive voltage is applied to an attraction coil 43 of the solenoid 21. The solenoid 21 is a self-holding solenoid, and the attraction coil 43 energized with the drive voltage causes a plunger 38 of the solenoid 21 to be maintained at an attracted position, thereby keeping the operation switch 41 secured. In contrast, the attraction coil 43 de-energized with the drive voltage causes the plunger 38 to return, thereby unlocking the operation switch 41.

Figure 4:
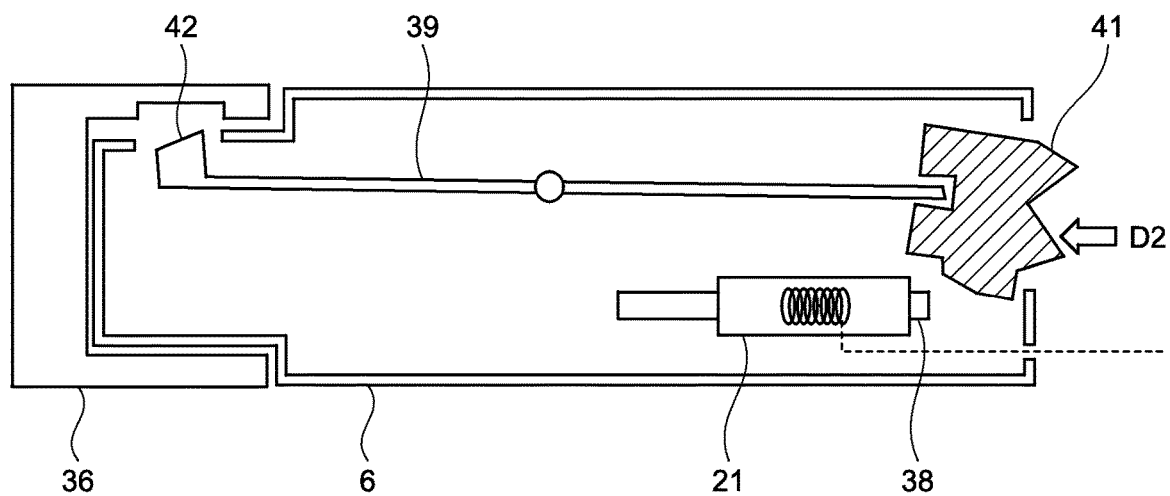
FIG. 4 is a diagram illustrating the locking mechanism illustrated in FIG. 3 in a second state.

FIG. 4 is a diagram illustrating the locking mechanism illustrated in FIG. 3 in a second state. In the second state, the drive voltage is not applied to the solenoid 21, thereby causing the plunger 38 to return, and thus unlocking the operation switch 41. Accordingly, when the user presses the lower portion of the operation switch 41 in a direction D2, the lock shaft latch 42 of the lock shaft 39 is released from the recessed portion of the receptacle 36. This allows the connector 6 to be unplugged from the receptacle 36.

By using the locking mechanism illustrated in FIGS. 3 and 4, application of the drive voltage from the power conversion system 100 to the solenoid 21 during charging and discharging of the electric-powered vehicle 5 can prevent the connector 6 from dropping out of the receptacle 36 during charging and discharging.

The cable relay 1 is disposed near the parking lot where the electric-powered vehicle 5 is parked. This usually places a restriction of installation space, and therefore, the cable relay 1 preferably has as small a size as possible. A size reduction of the cable relay 1 allows effective use of the parking lot space of the user, and also allows easy relocation of the cable relay 1 when the electric-powered vehicle 5 is newly purchased, replacing the old one, thereby leading to a change in the location of the receptacle 36 of the electric-powered vehicle 5.

To provide high flexibility of installation place of the cable relay 1, the length of the first cable 8 needs to be variable. The required length of the first cable 8 depends on the distance between the cable relay 1 and the charge-discharge system 4, and depends on user environment of usage. The cable resistance causes a drop of the drive voltage output from the charge-discharge system 4.

For example, denoting the length of the first cable 8 by m1 [m], the conductor resistance of the power line 13 in the first cable 8 by r1 [Ω/m], the length of the second cable 7 by m2 [m], the conductor resistance of the control signal line 15 in the second cable 7 by r2 [Ω/m], and the drive current by A1 [A], the amount of the voltage drop ΔV1 due to the first cable 8 is given as mathematical formula (1) below, and the amount of the voltage drop ΔV2 due to the second cable 7 is given as mathematical formula (2) below.

$$\Delta V1 = (m1 \times r1) \times A1 \tag{1}$$

$$\Delta V2 = (m2 \times r2) \times A1 \tag{2}$$

Assuming here that r1, r2=0.025 [Ω/m] and A1=2 [A], a length of the first cable 8 of m1=5 [m] will result in the amount of the voltage drop of ΔV1 (5 m)=0.25 [V], while a length of the first cable 8 of m1=20 [m] will result in the amount of the voltage drop of ΔV1 (20 m)=1.00 [V]. In this case, the difference in the amount of the voltage drop is 0.75 [V]. Note that effects of temperature are ignored here. When the drive voltage output from the charge-discharge system 4 is simply relayed by the cable relay 1, and is provided to the solenoid 21 of the connector 6, a difference will occur in the drive voltage provided to the solenoid 21 depending on the length of the first cable 8. Depending on the length of the first cable 8, the drive voltage may fall below the voltage level required to drive the solenoid 21, which may destabilize the operation of the solenoid 21, or may even cause malfunction of the locking mechanism.

Thus, the cable relay 1 according to the present embodiment includes the power supply for solenoid drive voltage 23, which is a power supply that provides the drive voltage to the solenoid 21. This allows the value of the drive voltage output from the cable relay 1 to be maintained constant, and thus enables flexible use of the length of the first cable 8.

The adjustment of the value of the drive voltage is performed in the solenoid voltage control circuit 26 of the second power conversion device 2. Using the voltage adjustment value α [V] by the power supply for solenoid drive voltage 23 of the cable relay 1, a first drive voltage V1 output from the second power conversion device 2, a second drive voltage V2 input to the cable relay 1, a third drive voltage V3 output from the cable relay 1, and a fourth drive voltage V4 input to the solenoid 21, relationships between these drive voltages are represented by mathematical formulae (3), (4), and (5) below. The locations of these drive voltages are illustrated in FIG. 2.

$$V2 = V1 - (m1 \times r1) \times A1 \quad (3)$$

$$V3 = V2 \pm \alpha \quad (4)$$

$$V4 = V3 - (m2 \times r2) \times A1 \quad (5)$$

By feeding back the third drive voltage V3 output by the power supply for solenoid drive voltage 23 of the cable relay 1 to the solenoid voltage control circuit 26 of the second power conversion device 2, the solenoid voltage control circuit 26 can control the drive voltage provided to the solenoid 21 using mathematical formulae (3) to (5).

FIG. 5 is a flowchart illustrating an operation of the solenoid voltage control circuit 26 illustrated in FIG. 2. The solenoid voltage control circuit 26 first obtains the length m1 of the first cable 8 and the length m2 of the second cable 7 (step S101). For example, the length m1 of the first cable 8 and the length m2 of the second cable 7 can be values entered by the user using the remote controller 35.

The solenoid voltage control circuit 26 obtains the feedback value of the third drive voltage V3, which is the drive voltage provided to the solenoid 21 by the cable relay 1 (step S102). The solenoid voltage control circuit 26 controls the drive voltage value for the solenoid 21 to allow the fourth drive voltage V4 to satisfy the voltage specification of the solenoid 21 based on the length m1 of the first cable 8, on the length m2 of the second cable 7, and on the feedback value of the third drive voltage V3 that have been obtained (step S103).

For example, the solenoid voltage control circuit 26 outputs a control signal for regulating the voltage of the power supply for solenoid drive voltage 23, and is thus capable of controlling the drive voltage value. In this operation, the value of the first drive voltage V1 output by the solenoid drive power supply 28 may be a predetermined constant value, or the solenoid voltage control circuit 26 may otherwise control the value of the first drive voltage V1.

As described above, the power conversion system 100 according to the first embodiment of the present invention includes the power supply for solenoid drive voltage 23, which is a power supply used by the cable relay 1 to provide the drive voltage to the solenoid 21. This enables the value of the drive voltage output by the cable relay 1 to be controlled, and thus enables the drive voltage having a value dependent on the lengths of the first cable 8 and of the second cable 7 to be provided to the solenoid 21. Accordingly, even when the length of the first cable 8 varies, the connector 6 including the solenoid 21 and the electric-powered vehicle 5 can be reliably secured to each other, and thus the flexibility of the installation location of the cable relay 1 can be increased.

In addition, configuring the cable relay 1 by only the charge-discharge connector 22 and the power supply for solenoid drive voltage 23 can reduce the size and the weight of the cable relay 1. For example, the cable relay 1 can be mounted on a wall.

Moreover, the present embodiment provides an increase in the flexibility of the installation place of the cable relay 1, and can thus reduce the distance from the cable relay 1 to the electric-powered vehicle 5. A shorter distance from the cable relay 1 to the electric-powered vehicle 5 allows a shorter length of the second cable 7, and can thus provide a lower cost and a less weight of the second cable 7. A reduced weight of the second cable 7 facilitates handling of the second cable 7 by the user, and can thus improve operability.

A hardware configuration of the power conversion system 100 according to the first embodiment of the present invention will next be described. The functionality of the power supply for solenoid drive voltage 23, the DC-DC converter 24, the second control circuit 25, the solenoid voltage control circuit 26, the second power supply circuit 27, the solenoid drive power supply 28, the DC-AC converter 29, the first control circuit 30, the first power supply circuit 31, and the remote controller 35 is implemented in processing circuits. These processing circuits may each be implemented by a dedicated hardware element, or may be a control circuit using a central processing unit (CPU).

In a case in which the above processing circuits are each implemented by a dedicated hardware element, the foregoing functionality is implemented in a processing circuit 90 illustrated in FIG. 6. FIG. 6 is a diagram illustrating a dedicated hardware element for implementing the functionality of the power conversion system 100 according to the first embodiment of the present invention. The processing circuit 90 is a single circuit, a set of multiple circuits, a programmed processor, a set of multiple programmed processors, an application specific integrated circuit (ASIC), a field programmable gate array (FPGA), or a combination thereof.

In a case in which the above processing circuits are each implemented by a control circuit using a CPU, this control circuit is, for example, a control circuit 91 configured as illustrated in FIG. 7. FIG. 7 is a diagram illustrating a configuration of the control circuit 91 for implementing the functionality of the power conversion system 100 according to the first embodiment of the present invention. As illustrated in FIG. 7, the control circuit 91 includes a processor 92 and a memory 93. The processor 92 is a CPU, which is also known as a central processing unit, a processing unit, a computing unit, a microprocessor, a microcomputer, a digital signal processor (DSP), or the like. The memory 93 is, for example, a non-volatile or volatile semiconductor memory such as a random access memory (RAM), a read-only memory (ROM), a flash memory, an erasable programmable ROM (EPROM), or an electrically erasable programmable ROM (EEPROM) (registered trademark); a magnetic disk, a flexible disk, an optical disk, a compact disc, a MiniDisc, a digital versatile disk (DVD), or the like.

In a case in which the above processing circuits are each implemented by the control circuit 91, the foregoing functionality is implemented by the processor 92 that reads and executes a program or programs corresponding to the processing of each component, stored in the memory 93. The memory 93 is also used as a temporary memory for each of the processing performed by the processor 92.

The configurations described in the foregoing embodiment are merely examples of various aspects of the present invention. These configurations may be combined with a known other technology, and moreover, a part of such configurations may be omitted and/or modified without departing from the spirit of the present invention.

For example, the foregoing embodiment has been described in terms of the first power conversion device 3 and the second power conversion device 2 that support both charging and discharging. However, the first power conversion device 3 and the second power conversion device 2 may be devices only having functionality of either charging or discharging.

The foregoing embodiment has also been described in terms of the charge-discharge system 4 that uses electricity from the grid power supply 10 to charge the electric-powered vehicle 5, but the present embodiment is not limited to such example. For example, the charge-discharge system 4 may be connected to a power generation system such as a sunlight power generation apparatus to charge the electric-powered vehicle 5 with the generated electricity.

REFERENCE SIGNS LIST 1 cable relay; 2 second power conversion device; 3 first power conversion device; 4 charge-discharge system; 5 electric-powered vehicle; 6 connector; 7 second cable; 8 first cable; 9 residential load; 10 grid power supply; 11 DC power line; 12 vehicle communication line; 13 power line; 14 control line; 15 control signal line; 20, 22 charge-discharge connector; 21 solenoid; 23 power supply for solenoid drive voltage; 24 DC-DC converter; 25 second control circuit; 26 solenoid voltage control circuit; 27 second power supply circuit; 28 solenoid drive power supply; 29 DC-AC converter; 30 first control circuit; 31 first power supply circuit; 32 DC bus voltage; 33 storage battery; 35 remote controller; receptacle; 38 plunger; 39 lock shaft; 40 pivot point; 41 operation switch; 42 lock shaft latch; 43 attraction coil; 100 power conversion system; V1 first drive voltage; V2 second drive voltage; V3 third drive voltage; V4 fourth drive voltage.

The invention claimed is:

1. A power conversion system comprising:
a power converter to control charging or discharging of an electric-powered vehicle including a storage battery; and
a cable relay connected to the power converter via a first cable, and connected to a connector connectable to the electric-powered vehicle, via a second cable,
wherein the cable relay includes a power supply to provide a drive voltage to a solenoid included in the connector, the drive voltage being controlled based on a first numerical value corresponding to a length of the first cable and a second numerical value corresponding to a length of the second cable.

2. The power conversion system according to claim 1, wherein
the power converter includes a solenoid drive power supply to generate drive voltage for the solenoid, and
the power supply regulates a value of the drive voltage provided from the solenoid drive power supply, and provides the drive voltage having a regulated value to the solenoid.

3. The power conversion system according to claim 2, wherein the power supply feeds back, to the power converter, the value of the drive voltage to be provided to the solenoid, and
the power converter further includes a solenoid voltage control circuit to control the drive voltage based on the value of the voltage value that has been fed back, the first numerical value corresponding to the length of the first cable, and the second numerical value corresponding to the length of the second cable.

4. The power conversion system according to claim 3, wherein the solenoid voltage control circuit controls the drive voltage by adjusting at least one of an adjustment value of the power supply and a value of the drive voltage generated by the solenoid drive power supply.

5. The power conversion system according to claim 1, wherein the cable relay has connection ports for the first cable and for the second cable, and at least one of the first cable or the second cable is replaceable.

6. The power conversion system according to claim 1 further comprising:
a remote controller to remotely control the power converter,
wherein the remote controller includes a display that displays a configuration screen for entering a length of at least one of the first cable or the second cable.

7. The power conversion system according to claim 6, wherein the remote controller is a smartphone, a tablet terminal, or part of a home energy management system.

8. The power conversion system according to claim 1, wherein the connector is pluggable into the electric-powered vehicle, and
the solenoid forms a locking mechanism to mechanically secure the connector to prevent the connector from dropping out of the electric-powered vehicle.

9. The power conversion system according to claim 2, wherein the first cable includes, bundling in a single cable,
a charge-discharge power line to the storage battery,
a communication line to communicate with the electric-powered vehicle,
a power line for the solenoid, and
a control line to control the power supply.

10. A cable relay comprising:
a first connection port connected to a power converter via a first cable;
a second connection port connected to a connector connectable to an electric-powered vehicle including a storage battery, via a second cable; and
a power supply to provide a drive voltage to a solenoid included in the connector, the drive voltage being controlled based on a first numerical value corresponding to a length of the first cable and a second numerical value corresponding to a length of the second cable.

* * * * *